(12) United States Patent
Paxton et al.

(10) Patent No.: US 12,223,949 B2
(45) Date of Patent: Feb. 11, 2025

(54) SEMANTIC REARRANGEMENT OF UNKNOWN OBJECTS FROM NATURAL LANGUAGE COMMANDS

(71) Applicant: NVIDIA Corporation, Santa Clara, CA (US)

(72) Inventors: Christopher Jason Paxton, Pittsburgh, PA (US); Weiyu Liu, Atlanta, GA (US); Tucker Ryer Hermans, Salt Lake City, UT (US); Dieter Fox, Seattle, WA (US)

(73) Assignee: NVIDIA Corporation, Santa Clara, CA (US)

( * ) Notice: Subject to any disclaimer, the term of this patent is extended or adjusted under 35 U.S.C. 154(b) by 304 days.

(21) Appl. No.: 17/930,349

(22) Filed: Sep. 7, 2022

(65) Prior Publication Data

US 2023/0073154 A1 Mar. 9, 2023

Related U.S. Application Data

(60) Provisional application No. 63/241,293, filed on Sep. 7, 2021.

(51) Int. Cl.
*G06F 40/30* (2020.01)
*B25J 13/00* (2006.01)
(Continued)

(52) U.S. Cl.
CPC .......... *G10L 15/1815* (2013.01); *B25J 13/003* (2013.01); *G10L 15/22* (2013.01); *G10L 2015/223* (2013.01)

(58) Field of Classification Search
CPC .......... G06F 40/30; G06F 40/00; G06F 40/12; G06F 40/151; G06F 40/20; G06F 40/205;
(Continued)

(56) References Cited

U.S. PATENT DOCUMENTS

2017/0372527 A1* 12/2017 Murali ................. H04N 13/239
2018/0268065 A1* 9/2018 Parepally ............... G06N 20/00
(Continued)

OTHER PUBLICATIONS

Mees, O., et al., "Metric learning for generalizing spatial relations to new objects," in 2017 IEEE/RSJ Int'l Conference on Intelligent Robots and Systems (IROS), IEEE, 2017, pp. 3175-3182.
(Continued)

*Primary Examiner* — Qi Han
(74) *Attorney, Agent, or Firm* — Leydig, Voit & Mayer, Ltd.

(57) ABSTRACT

A robotic system is provided for performing rearrangement tasks guided by a natural language instruction. The system can include a number of neural networks used to determine a selected rearrangement of the objects in accordance with the natural language instruction. A target object predictor network processes a point cloud of the scene and the natural language instruction to identify a set of query objects that are to-be-rearranged. A language conditioned prior network processes the point cloud, natural language instruction, and the set of query objects to sample a distribution of rearrangements to generate a number of sets of pose offsets for the set of query objects. A discriminator network then processes the samples to generate scores for the samples. The samples may be refined until a score for at least one of the sample generated by the discriminator network is above a threshold value.

20 Claims, 9 Drawing Sheets

(51) Int. Cl.
  *G10L 15/18* (2013.01)
  *G10L 15/22* (2006.01)
(58) Field of Classification Search
  CPC .... G06F 40/263; G06F 40/279; G06F 40/295;
       G06F 40/35; G06F 40/40; G06F 40/56;
       G06F 40/58; G10L 15/18; G10L 15/22;
       G10L 15/00; G10L 15/05; G10L 15/01;
       G10L 15/06; G10L 15/063; G10L 15/16;
       G10L 15/183; G10L 15/20; G10L 15/24;
                                    G10L 15/25
  USPC ............. 704/3, 1, 2, 9, 257, 272, 270.1, 275
  See application file for complete search history.

(56) References Cited

U.S. PATENT DOCUMENTS

| | | | | |
|---|---|---|---|---|
| 2019/0172261 | A1* | 6/2019 | Alt | G06T 19/20 |
| 2020/0368616 | A1* | 11/2020 | Delamont | H04N 13/239 |
| 2022/0335647 | A1* | 10/2022 | Shrivastava | G06V 10/82 |

OTHER PUBLICATIONS

Mees, O., et al., "Learning object placements for relational instructions by hallucinating scene representations," in 2020 IEEE International Conference on Robotics and Automation (ICRA), IEEE, 2020, pp. 94-100.
Janner, M., et al., "Representation learning for grounded spatial reasoning," Transactions of the Association for Computational Linguistics, vol. 6, pp. 49-61, 2018.
Zhu, Y., et al., "Hierarchical planning for long-horizon manipulation with geometric and symbolic scene graphs," arXiv preprint arXiv:2012.07277, 2020.
Bisk, Y., et al., "Learning interpretable spatial operations in a rich 3D blocks world," in Thirty-Second AAAI Conference no Artificial Intelligence, 2018.
Hristov, Y., et al., "Disentangled relational representations for explaining and learning from demonstration," in Conference on Robot Learning, PMLR, 2020, pp. 870-884.
Johnson, J., et al., "CLEVR: A diagnostic dataset for compositional language and elementary visual reasoning," in Proceedings of the IEEE conference on computer vision and pattern recognition, 2017, pp. 2901-2910.
Zhang, C., et al., "RAVEN: a dataset for relational and analogical visual reasoning," in Proceedings of the IEEE/CVF Conference on Computer Vision and Pattern Recognition, 2019, pp. 5317-5327.
Barrett, D., et al., "Measuring abstract reasoning in neural networks," in International Conference on Machine Learning, PMLR, 2018, pp. 511-520.
Suhr, A., et al., "A corpus of natural language for visual reasoning," in Proceedings of the 55th Annual Meeting of the Association for Computational Linguistics (vol. 2: short papers), 2018, pp. 217-223.
Achlioptas, P., et al., "Learning representations and generative models for 3D point clouds," in International Conference on Machine Learning, PMLR, 2018, pp. 40-49.
Park, J.J., et al., "DeepSDF: Learning continuous signed distance functions for shape representation," in Proceedings of the IEEE/CVF Conference on Computer Vision and Pattern Recognition, 2019, pp. 165-174.
Mo, K., et al., "StructureNet: Hierarchical graph networks for 3D shape generation," arXiv preprint arXiv:1908.00575, 2019.
Wu, R., et al., "PQ-NET: A generative part seq2seq network for 3D shapes," in Proceedings of the IEEE/CVF Conference on Computer Vision and Pattern Recognition, 2020, pp. 829-838.
Li, J., et al., "GRASS: Generative recursive autoencoders for shape structures," ACM Transactions on Graphics (TOG), vol. 36, No. 4, pp. 1-14, 2017.
Li, M., et al., "GRAINS: Generative recursive autoencoders for INdoor scenes," ACM Transactions on Graphics (TOG), vol. 38, No. 2, pp. 1-16, 2019.
Vaswani, A., et al., "Attention is all you need," in Advances in neural information processing systems, 2017, pp. 5998-6008.
De Boer, P.T., et al., "A tutorial on the cross-entropy method," Annals of operations research, vol. 134, No. 1, pp. 19-67, 2005.
Morrical, N., et al., "NViSII: A scriptable tool for photorealistic image generation," arXiv preprint arXiv:2105.13962, 2021.
Wang, X., et al., "SceneFormer: Indoor scene generation with transformers," arXiv preprint arXiv:2012.09793, 2020.
Radevski, G., et al., "Decoding language spatial relations to 2D arrangements," in Proceedings of the 2020 Conference on Empirical Methods in Natural Language Processing: Findings, 2020, pp. 4549-4560.
Qureshi, A.H., et al., "NeRP: Neural rearrangement planning for unknown objects," arXiv preprint arXiv:2106.01352, 2021.

\* cited by examiner

SEMANTIC REARRANGEMENT OF UNKNOWN OBJECTS FROM NATURAL LANGUAGE COMMANDS

CROSS-REFERENCE TO RELATED APPLICATIONS

This application claims the benefit of U.S. Provisional Application No. 63/241,293 titled "Semantic Rearrangement of Unknown Objects from Natural Language Commands," filed Sep. 7, 2021, the entire contents of which is incorporated herein by reference.

BACKGROUND

Robots are increasingly being transitioned from specialized, single-task machines to general-purpose systems that operate across a variety of tasks in everyday human environments. Object rearrangement has been proposed as a canonical task for embodied systems, with broad applications such as setting tables, cleaning beds, and rearranging furniture.

While many solutions for such tasks exist, much of the prior work has focused on physically transforming an initial visual scene to match a target image. However, obtaining a target image for real-world scenarios may not be feasible, which may burden users to provide additional context to the problem by defining task goals for the robotic system. There is a need for addressing these issues and/or other issues associated with the prior art.

SUMMARY

A method and system for rearranging objects is provided. The system includes a number of neural networks that process a point cloud and a natural language instruction to predict a set of pose offsets that rearrange the objects in accordance with the natural language instruction.

In accordance with a first aspect of the present disclosure, a method for rearranging the objects is provided. The method includes: receiving a point cloud and a natural language instruction; generating, via a first network, an instance mask based on the natural language instruction, wherein the instance mask identifies a set of query objects in a point cloud; generating, via a second network, samples of pose offsets for the set of query objects in accordance with the natural language instruction; and identifying, via a discriminator network, a selected rearrangement of the set of query objects in accordance with the scores.

In an embodiment of the first aspect, the point cloud represents a scene including a plurality of objects, and the set of query objects is a subset of the objects in the scene that are identified to be moved in order to satisfy the natural language instruction.

In an embodiment of the first aspect, at least one of the first network or the second network is configured to generate embeddings for the point cloud and the natural language instruction used as inputs to the first network or the second network.

In an embodiment of the first aspect, at least one of the first network or the second network is a transformer-based neural network comprising an encoder and a decoder. Each of the encoder and the decoder comprises a plurality of layers.

In an embodiment of the first aspect, a layer of the encoder includes a first sub-layer that includes a multi-head attention mechanism and a second sub-layer that includes a fully-connected feed-forward layer.

In an embodiment of the first aspect, a layer of the decoder includes a first sub-layer that includes a masked multi-head attention mechanism, a second sub-layer that includes a multi-head attention mechanism, and a third sub-layer that includes a fully-connected feed-forward layer.

In an embodiment of the first aspect, each sample comprises a set of pose offsets corresponding to the set of query objects, and wherein each pose offset comprises a parameterization of a six degree of freedom (6-DOF) transformation.

In an embodiment of the first aspect, identifying the selected rearrangement comprises: comparing each score predicted by the third network to a threshold value; and selecting a particular sample having a score that is greater than the threshold value as the selected rearrangement, or responsive to determining that no samples have a score greater than the threshold value, refining the samples using a cross-entropy method.

In an embodiment of the first aspect, the method further includes: rearranging a number of objects using a robot based on the selected rearrangement.

In an embodiment of the first aspect, the method further includes: training the third network using a set of scenes and a set of randomly perturbed scenes as positive and negative samples, respectively.

In accordance with a second aspect of the present disclosure, a system is provided for rearranging objects in a scene. The system includes: a memory storing a point cloud and a natural language instruction; and at least one processor. The at least one processor is configured to: generate, via a first network, an instance mask based on the natural language instruction, wherein the instance mask identifies a set of query objects in a point cloud; generate, via a second network, samples of pose offsets for the set of query objects in accordance with the natural language instruction; and identify, via a discriminator network, a selected rearrangement of the set of query objects in accordance with the scores.

In an embodiment of the second aspect, the point cloud represents a scene including a plurality of objects, and the set of query objects is a subset of the objects in the scene that are identified to be moved in order to satisfy the natural language instruction.

In an embodiment of the second aspect, at least one of the first network or the second network is configured to generate embeddings for the point cloud and the natural language instruction used as inputs to the first network or the second network.

In an embodiment of the second aspect, at least one of the first network or the second network is a transformer-based neural network comprising an encoder and a decoder. Each of the encoder and the decoder comprises a plurality of layers.

In an embodiment of the second aspect, a layer of the encoder includes a first sub-layer that includes a multi-head attention mechanism and a second sub-layer that includes a fully-connected feed-forward layer.

In an embodiment of the second aspect, a layer of the decoder includes a first sub-layer that includes a masked multi-head attention mechanism, a second sub-layer that includes a multi-head attention mechanism, and a third sub-layer that includes a fully-connected feed-forward layer.

In an embodiment of the second aspect, each sample comprises a set of pose offsets corresponding to the set of query objects, and wherein each pose offset comprises a parameterization of a six degree of freedom (6-DOF) transformation.

In an embodiment of the second aspect, identifying the selected rearrangement comprises: comparing each score predicted by the third network to a threshold value; and selecting a particular sample having a score that is greater than the threshold value as the selected rearrangement, or responsive to determining that no samples have a score greater than the threshold value, refining the samples using a cross-entropy method.

In an embodiment of the second aspect, the system further includes a robot that rearranges a number of objects based on the selected rearrangement.

In accordance with a third aspect of the present disclosure, a non-transitory computer readable medium is provided that stores instructions. The instructions, responsive to being executed by at least one processor, cause a system to: receive a point cloud and a natural language instruction; generate, via a first network, an instance mask based on the natural language instruction, wherein the instance mask identifies a set of query objects in a point cloud; generate, via a second network, samples of pose offsets for the set of query objects in accordance with the natural language instruction; and identify, via a discriminator network, a selected rearrangement of the set of query objects in accordance with the scores.

BRIEF DESCRIPTION OF THE DRAWINGS

The present systems and methods for fast retraining of fully-fused neural transceiver components are described in detail below with reference to the attached drawing figures, wherein.

DETAILED DESCRIPTION

A goal of the present disclosure is to provide a solution for object rearrangement tasks performed by a robotic system, where access to models for the objects to-be-arranged is not readily available. In addition, the solution is achieved using only an input of a natural language instruction describing how the objects should be arranged. The system should predict, based on the natural language instruction, which objects are relevant and how to move each object to put the objects into the target configuration described by the natural language instruction.

Embodiments of the present disclosure propose utilizing natural language commands as a medium for human-robot communications. Embodiments of the present disclosure may implement a system for rearranging objects in an environment based on natural language commands. Examples of exemplary natural language commands may include, but are not limited to, "build an L shape," "put all the mugs in a row," to "organize my desk," or "set the table, please."

Successful object arrangement in the real-world environment requires modeling complex semantic relations between objects. This skill relies on understanding physical relations between objects, and learning visual and geometric relations between objects. For example, a system must be able to understand which object in the scene a command is directed at as well as how objects interact (e.g., based on physics) and how objects of different shapes or colors can be sorted and arranged into visually consistent groups.

In addition to learning complex structures of object arrangement, there is a need to align semantic structures with natural language. First, conditioning scene semantics based on language forces the robotic system to learn generalizable and compositional concepts. For example, the same command "set the table" should compel the robotic system to perform a similar task in two very different settings such as a Michelin star restaurant and a family dining room. In other words, the robotic system may group these two visually different scenes within the same conceptual space. In addition, the robotic system may also be trained to compose complex scenes by composing arrangements that correspond to simpler language instructions. Second, concepts learned from rearranging objects are physically grounded in sensory and motor experiences of the robotic system, creating a richer representation for language.

Figure 1:
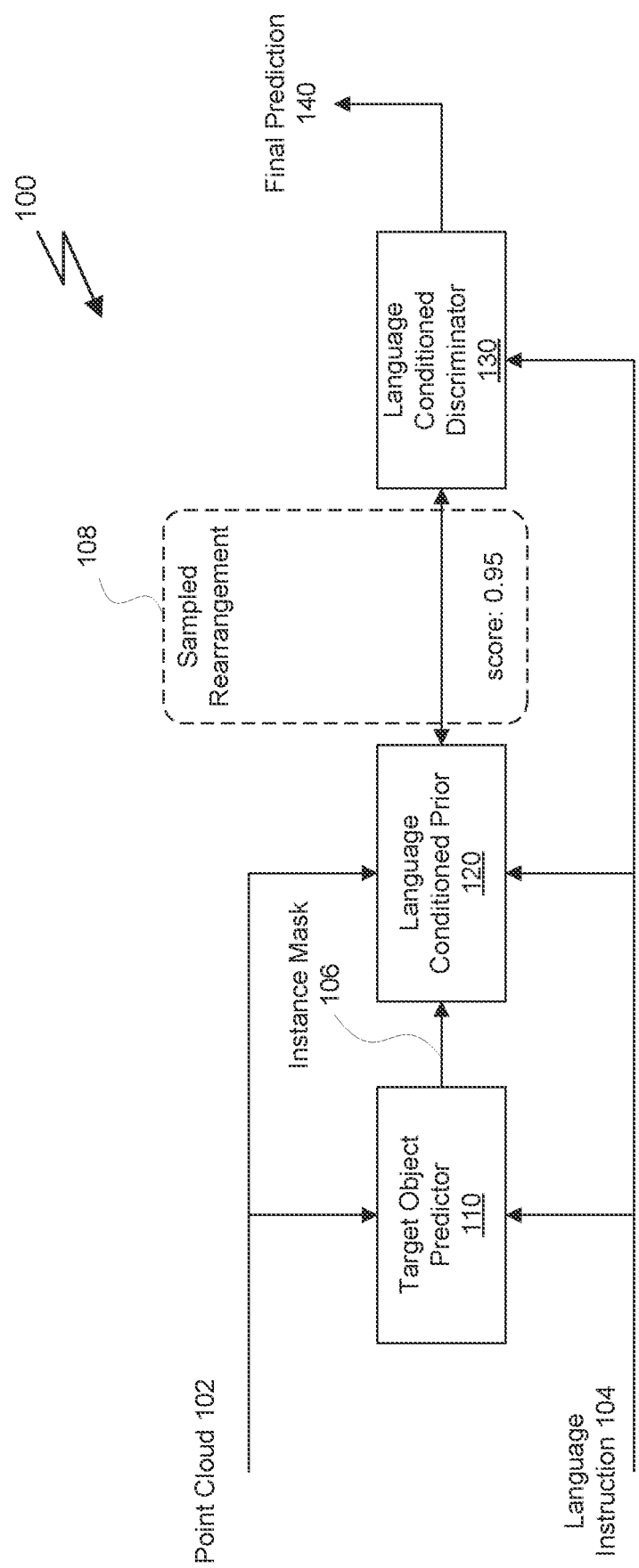
FIG. 1, illustrates a block diagram of a system, in accordance with an embodiment.

FIG. 1 illustrates a block diagram of a system 100 in accordance with an embodiment. The system 100 includes three networks that are referred to herein as a target object predictor 110, a language conditioned prior 120, and a language conditioned discriminator 130. In an embodiment, each of the target object predictor 110, the language conditioned prior 120, and the language conditioned discriminator 130 are neural networks. In some embodiments, one or more of the neural networks may be transformer-based networks, which are described in more detail below in conjunction with FIGS. 2A-2C.

Given a single view (e.g., image, point cloud, etc.) of a scene s containing objects $\{o_1, \ldots, o_N\}$ and a natural language instruction l containing word tokens $\{w_1, \ldots, w_M\}$, the system 100 is configured to rearrange a subset of the objects $\{o_1, \ldots, o_{N_q}\}$. $N_q < N$ to reach a goal scene s*. The goal scene should satisfy the spatial and semantic constraints encoded in the natural language instruction l 104 and be physically valid (e.g., objects after rearrangement should not interfere). In accordance with an embodiment, a partial-view point cloud 102 of the scene Z is provided with segment labels for each of the points to identify the different objects. In other words, each point can include the tuple $\{x, y, z, y\}$ where x, y, and z represent the three dimensional coordinates for the point relative to a coordinate system and y represents the segment label that takes value $0 \ldots N$ indicating the point belongs to either the background or one of the N objects. Given the point cloud 102 and the natural language instruction l 104, the system 100 is configured to determine pose offsets $\{\delta_1, \ldots, \delta_N\}$, which can transform the query objects $\{o_1, \ldots, o_N\}$ in the initial scene to the desired poses in the goal scene.

The target object predictor 110 predicts a subset of query objects $\{o_1, \ldots, o_{N_q}\}$ that need to be rearranged, based on the natural language instruction l 104 and the point cloud 102. The subset of query objects is then provided to the language conditioned prior 120 which samples potential pose offsets for the query objects. The potential pose offsets are then used to transform the point cloud (e.g., by applying the given pose offsets to each point in the point cloud associated with the corresponding query object) to create a candidate scene. The transformed point cloud is then processed by the language conditioned discriminator 130 to predict whether the rearrangement of the query objects is physically possible and closely follows the natural language instruction l 104. If the language conditioned discriminator 130 determines that the rearrangement is not physically possible or that the resulting candidate scene does not closely follow the natural language instruction l 104, then the language conditioned prior 120 may generate a new candidate scene based on a new sample of potential pose offsets, and the language conditioned discriminator 130 will evaluate that candidate scene. The process may continue until at least one candidate scene is accepted by the language conditioned discriminator 130.

In some embodiments, the language conditioned discriminator 130 can also be utilized with optimization methods such as a cross entropy method to further refine the rearrangements. Each of the networks as well as the optimization method may be discussed in further detail below.

In order to jointly model objects and language instructions, the point cloud 102 and the natural language instruction l 104 may be converted to hidden representations. Given a segmented point cloud $x_i$ of an object $o_i$, a mapping $h_o(x_i) \to \tilde{e}_i$ is learned to obtain a latent representation $\tilde{e}_i$ of the object $o_i$. The object encoder is based on the Point Cloud Transformer (PCT) model, which leverages a transformer-based network as a permutation-invariant function for learning from unordered points.

Each unique word token in the natural language instruction l 104 is also mapped to an embedding with a learned mapping $h_o(w_i) \to \tilde{c}_i$. The natural language instruction l 104 can take the form of a character string containing a number of word tokens arranged in a sequence. It will be appreciated that the natural language instruction l 104 can be in one or a number of different languages. In some embodiments, an audio command can be received by the system 100 and converted into a natural language instruction l 104 via any well-known techniques for automatically transcribing language from an audio file.

In an embodiment, in addition to the word embedding for each word token, a learned position embedding and/or a type embedding may also be used to differentiate the object point clouds and the word tokens. For example, each word token can be mapped to a position embedding that can encode the position of the word token in the natural language instruction l 104 as well as the relative position to other word tokens. Each word token can also be mapped to a learned type embedding that encodes the type of word token at a given position in the natural language instruction l 104. The final object embedding $e_n$ and word embedding $c_m$ can be obtained by concatenating $\tilde{e}_n$ and $\tilde{c}_m$ individually with the position and type embeddings.

In an embodiment, the target object predictor 110 predicts a subset of query objects that need to be rearranged based on the natural language instruction l 104 and the objects $\{o_1, \ldots, o_N\}$ in the point cloud 102. As an initial step, the natural language instruction l 104 and the objects $\{o_1, \ldots, o_N\}$ in the point cloud 102 are processed by an encoder to generate the input sequence for a transformer-based network, which comprises the concatenated embeddings $\{c_1, \ldots, c_M, e_1, \ldots, e_N\}$. The transformer-based network produces an output $\{y_1, \ldots, y_N\}$ at each object's position that is then fed into a linear layer to predict $\{k_1, \ldots, k_N\}$, where $k_i$ is a binary variable indicating whether the object $o_i$ needs to be rearranged. The result $\{k_1, \ldots, k_N\}$ may be referred to as the instance mask 106. Formally, the transformer-based encoder models the distribution:

$$p(\{k_i\}_{i=1}^N | \{e_j\}_{j=1}^N, \{c_i\}_{i=1}^N) = \Pi_{i=1}^N p(k_i | \{e_i\}_{i=1}^N, \{c_i\}_{i=1}^M) \quad \text{(Eq. 1)}$$

In an embodiment, the language conditioned prior 120 predicts a distribution over possible pose offsets for objects that might satisfy the natural language instruction l 104 and are physically valid. Again, a transformer-based network is used to generate the concatenated embeddings $\{c_1, \ldots, c_M, e_1, \ldots, e_N\}$ in order to build a contextualized representation of the language instruction and all the objects in the scene Z, including objects that need to be rearranged and those that remain stationary. The decoder in the transformer-based network auto-regressively predicts each object's pose offset $\delta_i$, conditioning on the global context and the pose offsets of previously predicted objects. Formally, the decoder receives the sequence $(e_0, [\delta_0; e_1], [\delta_1; e_2] \ldots, [\delta_{N_q-1}; e_{N_q}])$ and predicts $(\delta_0, \delta_1, \ldots, \delta_{N_q})$. They language conditioned prior 120 ensures that the input object poses are not used by the decoder by shifting the input object poses by one position and using a causal attention mask. The distribution is modeled by the language conditioned prior 120 as:

$$p(\{\delta_i\}_{i=1}^{N_q} | \{e_j\}_{j=1}^N, \{c_i\}_{i=1}^M) = \Pi_{i=1}^N p(\delta_i | \delta_{<i}, \{e_i\}_{i=1}^N, \{c_i\}_{i=1}^M) \quad \text{(Eq. 2)}$$

The language conditioned prior 120 is stochastic by using a dropout layer with probability $p \in [0,1]$ during training and inference. In other words, even given the same inputs, each processing pass of the language conditioned prior 120 will produce different object pose estimates due to the dropout layer. This enables an iterative process to be performed with the language conditioned discriminator 130 in order to reject some poses generated by the language conditioned prior 120 and generate a new sampled set of poses.

Each pose offset $\delta_i$ parameterizes a six degree of freedom (6-DOF) transformation that includes a three axis translation and a three axis rotation. In an embodiment, the language conditioned prior 120 directly predicts, for each pose offset $\delta_i$, a three element translation vector $t \in R^3$ and a pair of two element vectors that are used to construct a rotation matrix $R \in SO(3)$. An initial pose $\delta_0$ represents a 6-DOF pose of a virtual structure frame in the world frame. The pose $\delta_i, \forall i > 0$ defines the XYZ position of object $o_i$ in the structure frame and the relative rotational offset between its target and initial pose. The embedding $e_0$ is a learned embedding indicating the prediction of a virtual structure frame.

The order of the query objects in the input sequences are predefined for each spatial structure. For example, the rearranged objects will build a circle structure clockwise. Empirically, imposing an order on objects and using a virtual frame helps create precise spatial structures.

In an embodiment, the language conditioned discriminator 130 estimates if a rearranged scene follows the natural language instruction l 104 and is physically realistic. In order to plan on point clouds 102, a transform function is defined as:

$$T(Z_t, x_i \oplus \delta) \rightarrow Z_{t+1} \quad \text{(Eq. 3)}$$

Equation 3 represents a rigid transformation of points associated with an object $o_i$ to construct a new scene $Z_{t+1}$ according to the offset pose $\delta$. The language conditioned discriminator 130 can be used to both rank rearranged scenes hallucinated in the point cloud space Z and refine the offset predictions $\delta$.

The language conditioned discriminator 130 encodes the point cloud 102 of a whole scene Z with a PCT model. In an embodiment, a one-hot vector is used to indicate points belonging to each object $o_i$ and one more indicator feature to denote which points belong to the rearranged objects. The language conditioned discriminator 130 directly operates on point clouds of all objects in the scene Z and not only on the subset of query objects, thus allowing the network to more explicitly reason about fine-grained interactions between rearranged objects and stationary objects.

In one embodiment, during inference, the system 100 selects query objects to be rearranged based on the prediction from the target object predictor 110. The system then samples a batch of B rearrangements using the language conditioned prior 120 for the query objects. Given the sampled pose offsets, the transform operator T is used to transform point clouds of all query objects, and the language conditioned discriminator 130 is used to score the transformed scenes. The score is compared to a threshold value (e.g., score >0.95) to determine whether that sample is selected as the final prediction 140 which can be used, e.g., by a robotic system to implement the rearrangement task. In some embodiments, the score is forced to zero (i.e., a new sample is selected) if the discriminator determines there are collisions between objects in the scene $Z_{t+1}$. If no samples pass the condition after running the discriminator for all B samples, then a cross-entropy method (CEM) is used to refine the initial B samples and the process is repeated.

The system 100 can be trained with a training data set using data from rearrangement sequences. The target object predictor 110 is trained on initial scenes and ground truth query object sets with binary cross-entropy loss. The language conditioned prior 120 is trained with L2 loss minimizing the distance between ground truth and predicted offset poses. The language conditioned discriminator 130 is trained using a training data set that uses rearranged scenes as positive samples (e.g., scores >threshold) and randomly perturbed scenes as negative samples (scores <threshold). To create the perturbed scenes, a random selection of query objects are selected and the offset pose is sampled for each of the selected query objects. The transform operator is then applied to the sampled offset pose for those query objects to perturb the scene, essentially changing the offset for a random sampling of objects to change the scene. The resulting perturbed scene is highly likely to no longer maintain the spatial structure that satisfies the corresponding language instruction.

In an embodiment, one or more operations of the system 100 are implemented in a system that includes any combination of a parallel processing unit (PPU) or on a central processing unit (CPU). The system can be implemented on at least one processor coupled to a memory, where the processor includes one or more of the PPU and/or CPU. Alternatively, the processor can be a special-purpose machine such as an application specific integrated circuit (ASIC), digital signal processor (DSP), field-programmable gate array (FPGA), microcontroller (e.g., ARM RISC), or the like. The memory can be a volatile or non-volatile memory such as dynamic random access memory (DRAM), solid state memory (e.g., Flash memory), magnetic media (e.g., hard disc drive, HDD), or the like.

Although not shown explicitly in FIG. 1, the system can also include a robot for performing the rearrangement task. The robot may include one or more links coupled to an end effector and a controller that incorporates the system 100, described above. The end effector can include a gripper or other tool for grasping and moving objects in a scene. The robot may also include sensors (e.g., image sensors, depth sensors, LiDAR sensors, etc.) for capturing a point cloud of the scene. The system 100 can be used to determine control signals for the robot that cause the robot to move the objects in accordance with the selected rearrangement (e.g., sets of pose offsets).

Figure 2A:
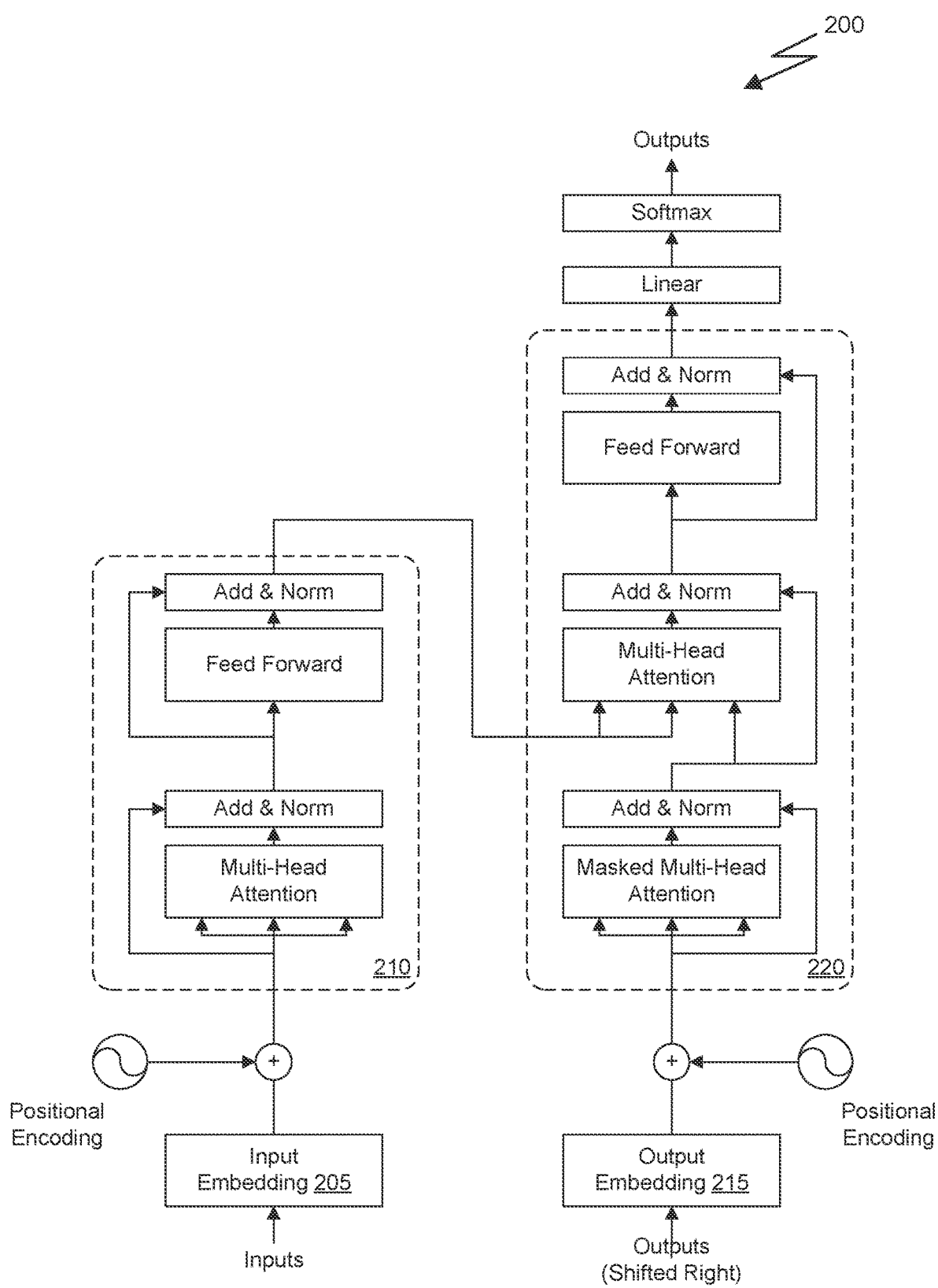
FIG. 2A illustrates a structure of a transformer-based neural network, in accordance with an embodiment.

FIG. 2A illustrates a structure of a transformer-based neural network 200, in accordance with an embodiment. The transformer-based neural network 200 has an encoder-decoder structure. The encoder maps an input sequence of symbols $\{x_1, \ldots, x_n\}$ to a sequence of continuous representations $z = \{z_1, \ldots, z_n\}$. Given the continuous representations z, the decoder then generates an output sequence $\{y_1, \ldots, y_m\}$ of symbols, one element at a time. At each step, the neural network 200 is auto-regressive, consuming the previously generated symbols as additional input when generating the next symbol.

As shown in FIG. 2A, the neural network 200 includes an encoder stack 210 and a decoder stack 220. The neural network 200 also includes the embedding network 205 that produces the input embeddings for the encoder stack 210 and the embedding network 215 that produces the output embeddings for the decoder stack 220. The encoder stack 210 includes a plurality of layers (e.g., N=6), with each layer including two sub-layers. The first sub-layer comprises a multi-head self-attention mechanism, and the second sub-layer comprises a fully-connected feed-forward layer. A residual connection is utilized around each of the two sub-layers, followed by a normalization operation. That is, the sub-layer output is equal to Norm(x+Sublayer(x)), where Sublayer(x) is the function implemented by the sub-layer. In an embodiment, to facilitate the residual connections, all sub-layers in the encoder stack 210 as well as the embedding layers produce outputs of dimension $d_{model}=512$.

The decoder stack 220 includes a plurality of layers (e.g., N=6), with each layer including three sub-layers. In addition to the two sub-layers in each encoder layer, the decoder layer adds another multi-head attention layer. A residual connection is utilized around each of the three sub-layers, followed by a normalization operation. The added multi-head attention layer utilizes masking to prevent positions from attending to subsequent positions in the sequence. This masking, combined with the fact that the output embeddings are offset by one position, ensures that the predictions for position i can depend only on the known outputs at positions less than i.

Figure 2B:
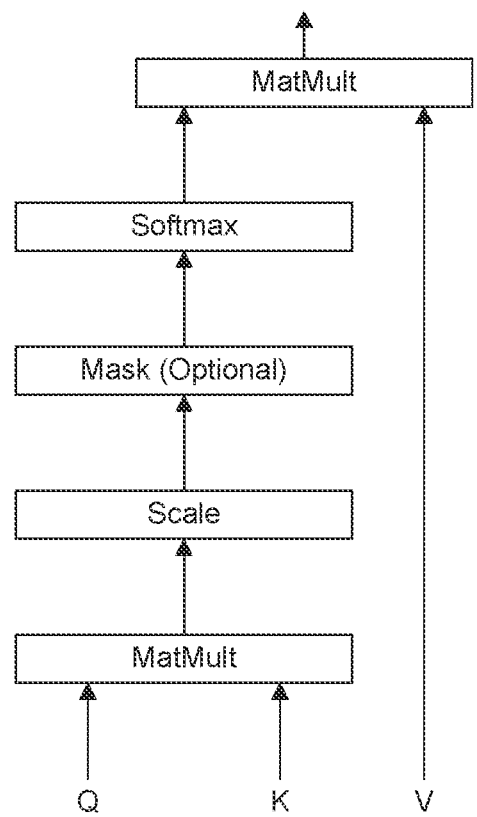
FIG. 2B illustrates a scaled dot-product attention function, in accordance with an embodiment.

FIG. 2B illustrates a scaled dot-product attention function, in accordance with an embodiment. The attention function utilized by the neural network 200 can be referred to as a scaled dot-product attention function. Generally, an attention function can be described as mapping a query and a set of key-value pairs to an output, where the query, keys, values, and output are vectors. The output is computed as a weighted sum of the values, where the weights assigned to each value is computed as a compatibility function of the query with the corresponding key. The scaled dot-product attention function computes the dot products of the queries with the keys, divides each by $\sqrt{d_k}$ (where $d_k$ is the dimension of the queries and keys), and applies a softmax function to obtain the weights applied to the values.

In practice, the attention function is computed on a set of queries simultaneously, packed together into a matrix Q. The keys and values are also packed together into matrices K and V, respectively, such that the matrix of outputs is given as:

$$\text{Attention}(Q, K, V) = \text{softmax}\left(\frac{QK^T}{\sqrt{d_k}}\right)V \quad \text{(Eq. 4)}$$

Figure 2C:
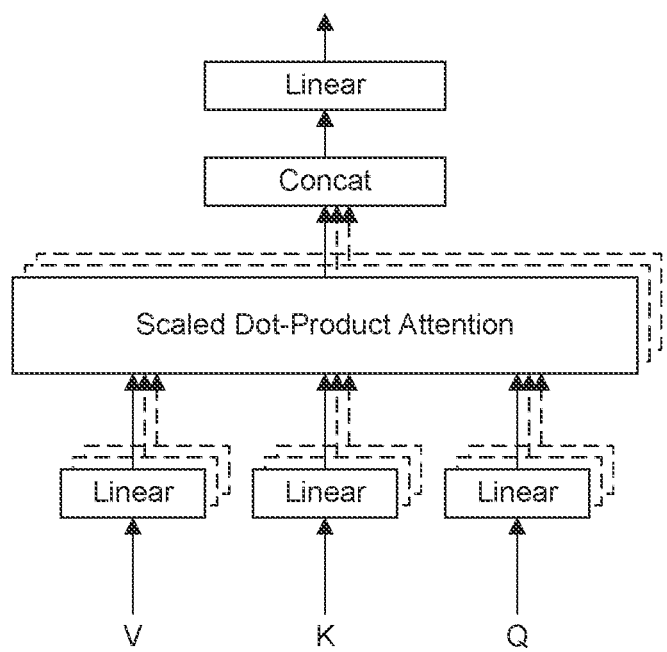
FIG. 2C illustrates a multi-head attention function, in accordance with an embodiment.

FIG. 2C illustrates a multi-head attention function, in accordance with an embodiment. Instead of performing a single attention function with $d_{model}$-dimension keys, values, and queries, it can be beneficial to linearly project the queries, keys, and values h times with different, learned linear projections to $d_k$, $d_k$, and $d_v$ dimensions, respectively. The scaled dot-product attention function is then performed in parallel on each of the sets of linearly projected vectors. The output vectors are then concatenated and once again projected, resulting in the final output values.

An example of a transformer-based neural network 200 is described in more detail in Vaswani et al., "Attention is All You Need," Advances in Neural Information Processing Systems (NIPS) 30, 2017), which is incorporated herein by reference in its entirety. It will be appreciated that one or more of the target object predictor 110, the language conditioned prior 120, and/or the language conditioned discriminator 130 may have a structure similar to the transformer-based neural network 200, described above.

Figure 3:
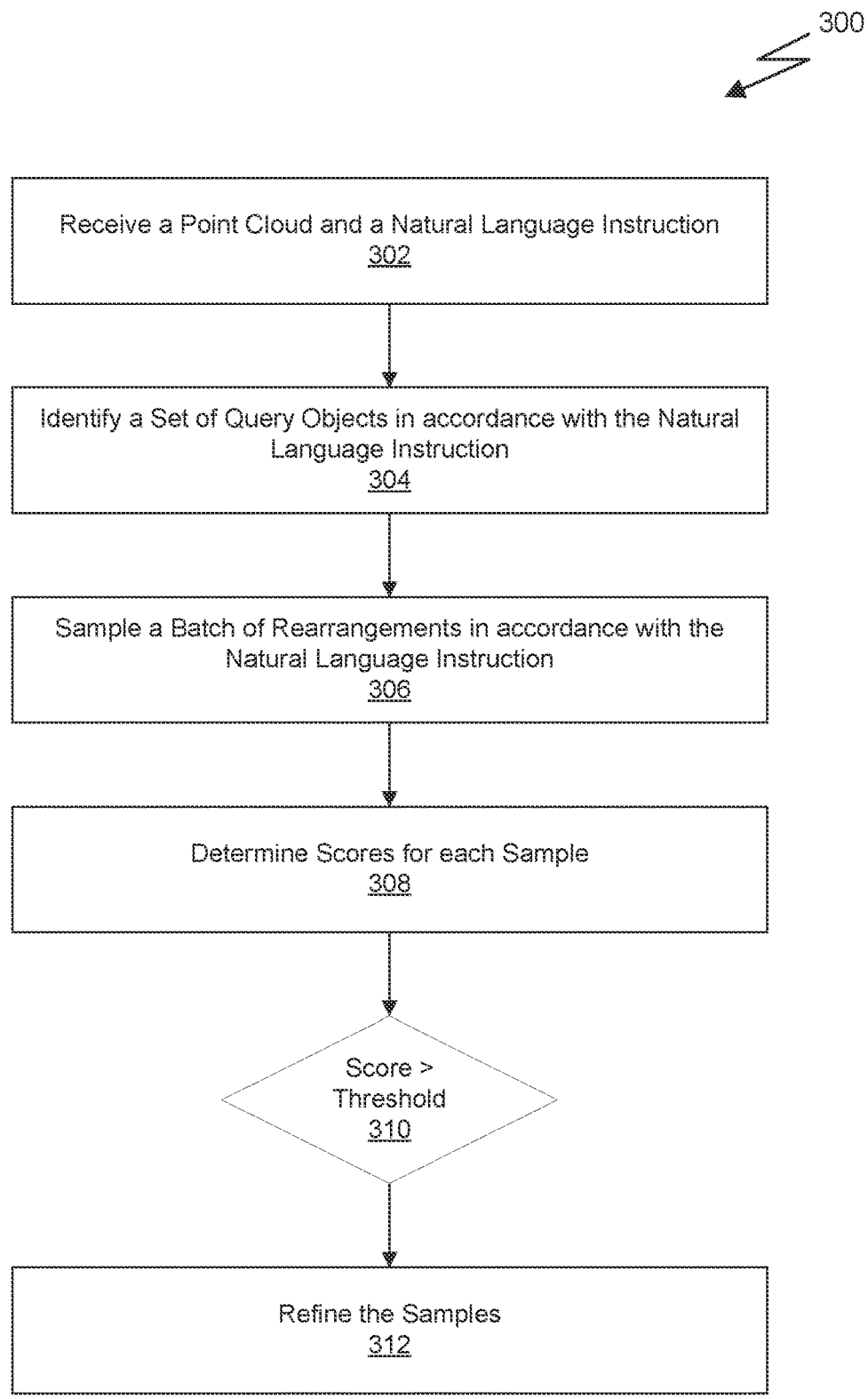
FIG. 3 illustrates a flowchart of a method for determining pose offsets associated with a rearrangement task, in accordance with an embodiment.

FIG. 3 illustrates a flowchart of a method for determining pose offsets associated with a rearrangement task, in accordance with an embodiment. The method may be implemented in any combination of hardware, software, firmware. In an embodiment, the method may, at least in part, be performed using a parallel processing unit.

At 302, a point cloud and a natural language instruction are received. In an embodiment, the point cloud may be stored in a memory. In some embodiments, the point cloud can be captured via LiDAR or some other type of depth sensing instrument. The natural language instruction can be received via an input device such as a keyboard. In some embodiments, the natural language instruction can be captured via an audio device and transcribed using any well-known transcription technique. In some cases, an artificial intelligences algorithm, such as a neural network, can be used to process the audio and generate the transcribed natural language instruction.

At 304, a set of query objects are identified in accordance with the natural language instruction. The set of query objects are selected as a subset of objects in the scene represented by the point cloud. In an embodiment, a first network (e.g., the target object predictor 110) processes the point cloud and the natural language instruction to identify the set of query objects. In some embodiments, the point cloud and the natural language instruction can be processed via an encoder to generate embeddings provided as input to the first network.

At 306, a batch of B rearrangements are sampled for the set of query objects in accordance with the natural language instruction. Each sample can include a set of pose offsets corresponding to the set of query objects generated by a second network. By processing the point cloud, natural language instruction, and the set of query objects generated by the first network a number of times, the second network generates B independent samples of sets of pose offsets. In an embodiment, the second network includes a stochastic mechanism such that each pass of the second network will produce different sets of pose offsets to satisfy the natural language command for a given set of query objects.

At 308, scores for each sample of the B rearrangements are determined by a third network (e.g., the language conditioned discriminator 130). The point cloud is transformed based on the pose offsets and then an embedding is generated for the target scene. The embedding is then processed by the trained network to generate the score. In some embodiments, the target scene can also be separately evaluated to ensure that the target scene is physically possible (e.g., that none of the rearranged objects overlap or interfere). If the target scene is not physically possible, then the score may be forced to zero. Otherwise, if the target scene is physically possible, then the score is predicted by the third network.

At 310, the scores are compared to a threshold value. In an embodiment, a threshold value may be pre-determined and the scores for each sample are compared to the threshold value. If at least one score is above then threshold value, then the system may select the sample with the highest score as the selected rearrangement. Otherwise, if no scores are above the threshold value, then the method proceeds to step 312, where the samples are refined.

At 312, the batch of B samples are refined. In an embodiment, each of the B samples are refined in accordance with a cross-entropy method. More specifically, the cross-entropy method uses the generated scores to refine the B samples, changing the pose offsets for each sample by a gradient value that is weighted by the inverse of the score. Thus, samples with lower scores are adjusted more than samples with higher scores such that the new refined samples converge towards a distribution with higher scores on average.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Parallel Processing Architecture

Figure 4:
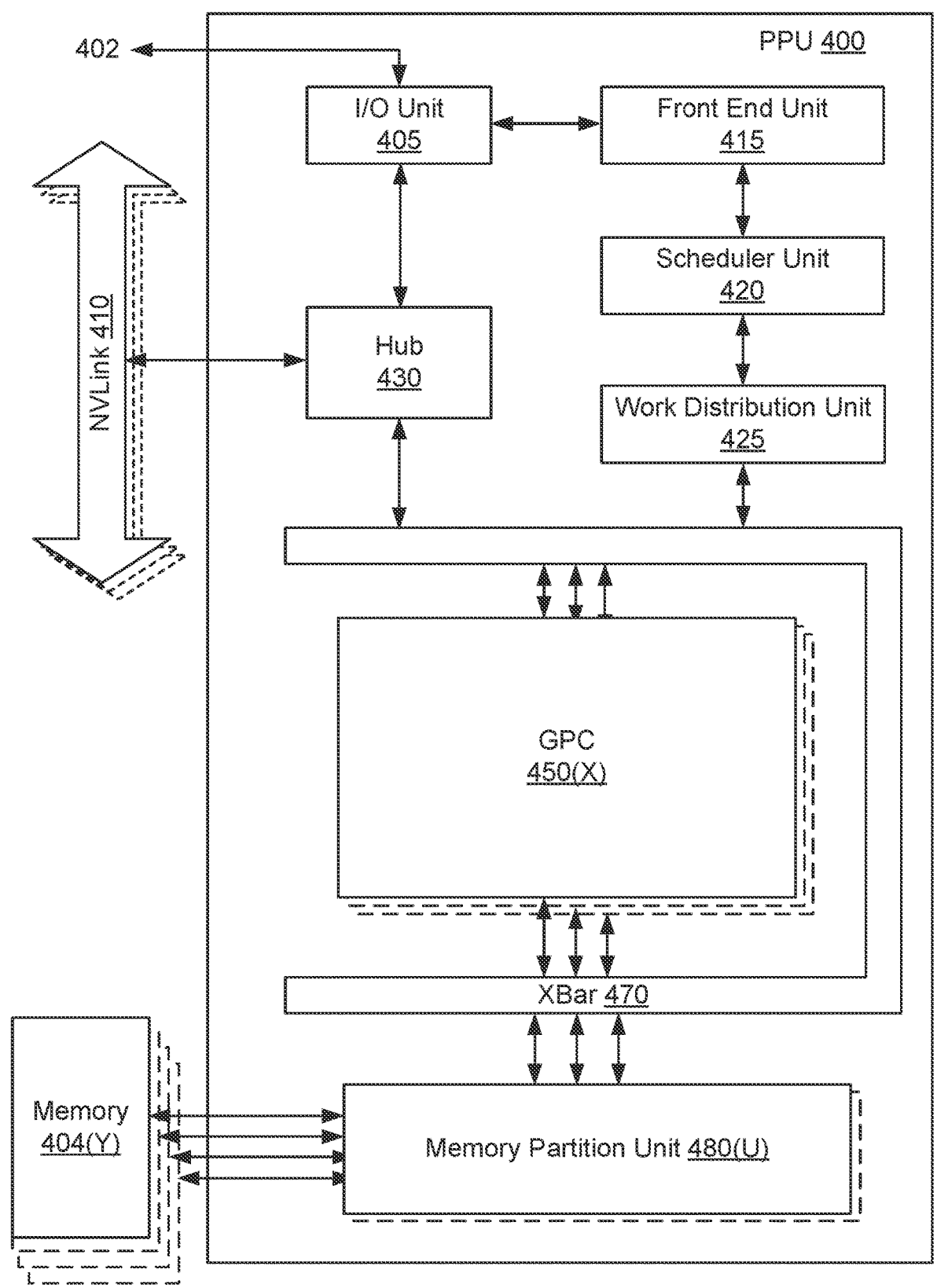
FIG. 4 illustrates an example parallel processing unit suitable for use in implementing some embodiments of the present disclosure.

FIG. 4 illustrates a parallel processing unit (PPU) 400, in accordance with an embodiment. The PPU 400 may be used to implement fast retraining of fully-fused neural transceiver components, in accordance with an embodiment. In an embodiment, the PPU 400 is a multi-threaded processor that is implemented on one or more integrated circuit devices. The PPU 400 is a latency hiding architecture designed to process many threads in parallel. A thread (e.g., a thread of execution) is an instantiation of a set of instructions configured to be executed by the PPU 400. In an embodiment, the PPU 400 is a graphics processing unit (GPU) configured to implement a graphics rendering pipeline for processing three-dimensional (3D) graphics data in order to generate two-dimensional (2D) image data for display on a display device. In other embodiments, the PPU 400 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 400 may be configured to accelerate thousands of High Performance Computing (HPC), data center, cloud computing, and machine learning applications. The PPU 400 may be configured to accelerate numerous deep learning systems and applications for autonomous vehicles, simulation, computational graphics such as ray or path tracing, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 4, the PPU 400 includes an Input/Output (I/O) unit 405, a front end unit 415, a scheduler unit 420, a work distribution unit 425, a hub 430, a crossbar (Xbar) 470, one or more general processing clusters (GPCs) 450, and one or more memory partition units 480. The PPU 400 may be connected to a host processor or other PPUs 400 via one or more high-speed NVLink 410 interconnect. The PPU 400 may be connected to a host processor or other peripheral devices via an interconnect 402. The PPU 400 may also be connected to a local memory 404 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 410 interconnect enables systems to scale and include one or more PPUs 400 combined with one or more CPUs, supports cache coherence between the PPUs 400 and CPUs, and CPU mastering. Data and/or commands may be transmitted by the NVLink 410 through the hub 430 to/from other units of the PPU 400 such as one or more copy engines, a video encoder, a video decoder, a power management unit, etc. (not explicitly shown). The NVLink 410 is described in more detail in conjunction with FIG. 5B.

The I/O unit 405 is configured to transmit and receive communications (e.g., commands, data, etc.) from a host processor (not shown) over the interconnect 402. The I/O unit 405 may communicate with the host processor directly via the interconnect 402 or through one or more intermediate devices such as a memory bridge. In an embodiment, the I/O unit 405 may communicate with one or more other processors, such as one or more the PPUs 400 via the interconnect 402. In an embodiment, the I/O unit 405 implements a Peripheral Component Interconnect Express (PCIe) interface for communications over a PCIe bus and the interconnect 402 is a PCIe bus. In alternative embodiments, the I/O unit 405 may implement other types of well-known interfaces for communicating with external devices.

The I/O unit 405 decodes packets received via the interconnect 402. In an embodiment, the packets represent commands configured to cause the PPU 400 to perform various operations. The I/O unit 405 transmits the decoded commands to various other units of the PPU 400 as the commands may specify. For example, some commands may be transmitted to the front end unit 415. Other commands may be transmitted to the hub 430 or other units of the PPU 400 such as one or more copy engines, a video encoder, a video decoder, a power management unit, etc. (not explicitly shown). In other words, the I/O unit 405 is configured to route communications between and among the various logical units of the PPU 400.

In an embodiment, a program executed by the host processor encodes a command stream in a buffer that provides workloads to the PPU 400 for processing. A workload may comprise several instructions and data to be processed by those instructions. The buffer is a region in a memory that is accessible (e.g., read/write) by both the host processor and the PPU 400. For example, the I/O unit 405 may be configured to access the buffer in a system memory connected to the interconnect 402 via memory requests transmitted over the interconnect 402. In an embodiment, the host processor writes the command stream to the buffer and then transmits a pointer to the start of the command stream to the PPU 400. The front end unit 415 receives pointers to one or more command streams. The front end unit 415 manages the one or more streams, reading commands from the streams and forwarding commands to the various units of the PPU 400.

The front end unit 415 is coupled to a scheduler unit 420 that configures the various GPCs 450 to process tasks defined by the one or more streams. The scheduler unit 420 is configured to track state information related to the various tasks managed by the scheduler unit 420. The state may indicate which GPC 450 a task is assigned to, whether the task is active or inactive, a priority level associated with the task, and so forth. The scheduler unit 420 manages the execution of a plurality of tasks on the one or more GPCs 450.

The scheduler unit 420 is coupled to a work distribution unit 425 that is configured to dispatch tasks for execution on the GPCs 450. The work distribution unit 425 may track a number of scheduled tasks received from the scheduler unit 420. In an embodiment, the work distribution unit 425 manages a pending task pool and an active task pool for each of the GPCs 450. As a GPC 450 finishes the execution of a task, that task is evicted from the active task pool for the GPC 450 and one of the other tasks from the pending task pool is selected and scheduled for execution on the GPC 450. If an active task has been idle on the GPC 450, such as while waiting for a data dependency to be resolved, then the active task may be evicted from the GPC 450 and returned to the pending task pool while another task in the pending task pool is selected and scheduled for execution on the GPC 450.

In an embodiment, a host processor executes a driver kernel that implements an application programming interface (API) that enables one or more applications executing on the host processor to schedule operations for execution on the PPU 400. In an embodiment, multiple compute applications are simultaneously executed by the PPU 400 and the PPU 400 provides isolation, quality of service (QOS), and independent address spaces for the multiple compute applications. An application may generate instructions (e.g., API calls) that cause the driver kernel to generate one or more tasks for execution by the PPU 400. The driver kernel outputs tasks to one or more streams being processed by the PPU 400. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. The tasks may be allocated to one or more processing units within a GPC 450 and instructions are scheduled for execution by at least one warp.

The work distribution unit 425 communicates with the one or more GPCs 450 via XBar 470. The XBar 470 is an interconnect network that couples many of the units of the PPU 400 to other units of the PPU 400. For example, the XBar 470 may be configured to couple the work distribution unit 425 to a particular GPC 450. Although not shown explicitly, one or more other units of the PPU 400 may also be connected to the XBar 470 via the hub 430.

The tasks are managed by the scheduler unit 420 and dispatched to a GPC 450 by the work distribution unit 425. The GPC 450 is configured to process the task and generate results. The results may be consumed by other tasks within the GPC 450, routed to a different GPC 450 via the XBar 470, or stored in the memory 404. The results can be written to the memory 404 via the memory partition units 480, which implement a memory interface for reading and writing data to/from the memory 404. The results can be transmitted to another PPU 400 or CPU via the NVLink 410. In an embodiment, the PPU 400 includes a number U of memory partition units 480 that is equal to the number of separate and distinct memory devices of the memory 404 coupled to the PPU 400. Each GPC 450 may include a memory management unit to provide translation of virtual addresses into physical addresses, memory protection, and arbitration of memory requests. In an embodiment, the memory management unit provides one or more translation lookaside buffers (TLBs) for performing translation of virtual addresses into physical addresses in the memory 404.

In an embodiment, the memory partition unit 480 includes a Raster Operations (ROP) unit, a level two (L2) cache, and a memory interface that is coupled to the memory 404. The memory interface may implement 32, 64, 128, 1024-bit data buses, or the like, for high-speed data transfer. The PPU 400 may be connected to up to Y memory devices, such as high bandwidth memory stacks or graphics double-data-rate, version 5, synchronous dynamic random access memory, or other types of persistent storage. In an embodiment, the memory interface implements an HBM2 memory interface and Y equals half U. In an embodiment, the HBM2 memory stacks are located on the same physical package as the PPU 400, providing substantial power and area savings compared with conventional GDDR5 SDRAM systems. In an embodiment, each HBM2 stack includes four memory dies and Y equals 4, with each HBM2 stack including two 128-bit channels per die for a total of 8 channels and a data bus width of 1024 bits.

In an embodiment, the memory 404 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 400 process very large datasets and/or run applications for extended periods.

In an embodiment, the PPU 400 implements a multi-level memory hierarchy. In an embodiment, the memory partition unit 480 supports a unified memory to provide a single unified virtual address space for CPU and PPU 400 memory, enabling data sharing between virtual memory systems. In an embodiment the frequency of accesses by a PPU 400 to memory located on other processors is traced to ensure that memory pages are moved to the physical memory of the PPU 400 that is accessing the pages more frequently. In an embodiment, the NVLink 410 supports address translation services allowing the PPU 400 to directly access a CPU's page tables and providing full access to CPU memory by the PPU 400.

In an embodiment, copy engines transfer data between multiple PPUs 400 or between PPUs 400 and CPUs. The copy engines can generate page faults for addresses that are not mapped into the page tables. The memory partition unit 480 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 404 or other system memory may be fetched by the memory partition unit 480 and stored in the L2 cache 460, which is located on-chip and is shared between the various GPCs 450. As shown, each memory partition unit 480 includes a portion of the L2 cache associated with a corresponding memory 404. Lower level caches may then be implemented in various units within the GPCs 450. For example, each of the processing units within a GPC 450 may implement a level one (L1) cache. The L1 cache is private memory that is dedicated to a particular processing unit. The L2 cache 460 is coupled to the memory interface 470 and the XBar 470 and data from the L2 cache may be fetched and stored in each of the L1 caches for processing.

In an embodiment, the processing units within each GPC 450 implement a SIMD (Single-Instruction, Multiple-Data) architecture where each thread in a group of threads (e.g., a warp) is configured to process a different set of data based on the same set of instructions. All threads in the group of threads execute the same instructions. In another embodiment, the processing unit implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

Each processing unit includes a large number (e.g., 128, etc.) of distinct processing cores (e.g., functional units) that may be fully-pipelined, single-precision, double-precision, and/or mixed precision and include a floating point arithmetic logic unit and an integer arithmetic logic unit. In an embodiment, the floating point arithmetic logic units implement the IEEE 754-2008 standard for floating point arithmetic. In an embodiment, the cores include 64 single-precision (32-bit) floating point cores, 64 integer cores, 32 double-precision (64-bit) floating point cores, and 8 tensor cores.

Tensor cores configured to perform matrix operations. In particular, the tensor cores are configured to perform deep learning matrix arithmetic, such as GEMM (matrix-matrix multiplication) for convolution operations during neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B may be integer, fixed-point, or floating point matrices, while the accumulation matrices C and D may be integer, fixed-point, or floating point matrices of equal or higher bitwidths. In an embodiment, tensor cores operate on one, four, or eight bit integer input data with 32-bit integer accumulation. The 8-bit integer matrix multiply requires 1024 operations and results in a full precision product that is then accumulated using 32-bit integer addition with the other intermediate products for a 8×8×16 matrix multiply. In an embodiment, tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each processing unit may also comprise M special function units (SFUs) that perform special functions (e.g., attribute evaluation, reciprocal square root, and the like). In an embodiment, the SFUs may include a tree traversal unit configured to traverse a hierarchical tree data structure. In an embodiment, the SFUs may include texture unit configured to perform texture map filtering operations. In an embodiment, the texture units are configured to load texture maps (e.g., a 2D array of texels) from the memory 404 and sample the texture maps to produce sampled texture values for use in shader programs executed by the processing unit. In an embodiment, the texture maps are stored in shared memory that may comprise or include an L1 cache. The texture units implement texture operations such as filtering operations using mip-maps (e.g., texture maps of varying levels of detail). In an embodiment, each processing unit includes two texture units.

Each processing unit also comprises N load store units (LSUs) that implement load and store operations between the shared memory and the register file. Each processing unit includes an interconnect network that connects each of the cores to the register file and the LSU to the register file, shared memory. In an embodiment, the interconnect network is a crossbar that can be configured to connect any of the cores to any of the registers in the register file and connect the LSUs to the register file and memory locations in shared memory.

The shared memory is an array of on-chip memory that allows for data storage and communication between the processing units and between threads within a processing unit. In an embodiment, the shared memory comprises 128 KB of storage capacity and is in the path from each of the processing units to the memory partition unit 480. The shared memory can be used to cache reads and writes. One or more of the shared memory, L1 cache, L2 cache, and memory 404 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory enables the shared memory to function as a high-throughput conduit for streaming data while simultaneously providing high-bandwidth and low-latency access to frequently reused data.

When configured for general purpose parallel computation, a simpler configuration can be used compared with graphics processing. Specifically, fixed function graphics processing units, are bypassed, creating a much simpler programming model. In the general purpose parallel computation configuration, the work distribution unit 425 assigns and distributes blocks of threads directly to the processing units within the GPCs 450. Threads execute the same program, using a unique thread ID in the calculation to ensure each thread generates unique results, using the processing unit(s) to execute the program and perform calculations, shared memory to communicate between threads, and the LSU to read and write global memory through the shared memory and the memory partition unit 480. When configured for general purpose parallel computation, the processing units can also write commands that the scheduler unit 420 can use to launch new work on the processing units.

The PPUs 400 may each include, and/or be configured to perform functions of, one or more processing cores and/or components thereof, such as Tensor Cores (TCs), Tensor Processing Units (TPUs), Pixel Visual Cores (PVCs), Ray Tracing (RT) Cores, Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The PPU 400 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 400 is embodied on a single semiconductor substrate. In another embodiment, the PPU 400 is included in a system-on-a-chip (SoC) along with one or more other devices such as additional PPUs 400, the memory 404, a reduced instruction set computer (RISC) CPU, a memory management unit (MMU), a digital-to-analog converter (DAC), and the like.

In an embodiment, the PPU 400 may be included on a graphics card that includes one or more memory devices. The graphics card may be configured to interface with a PCIe slot on a motherboard of a desktop computer. In yet another embodiment, the PPU 400 may be an integrated graphics processing unit (iGPU) or parallel processor included in the chipset of the motherboard. In yet another embodiment, the PPU 400 may be realized in reconfigurable hardware. In yet another embodiment, parts of the PPU 400 may be realized in reconfigurable hardware.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5A:
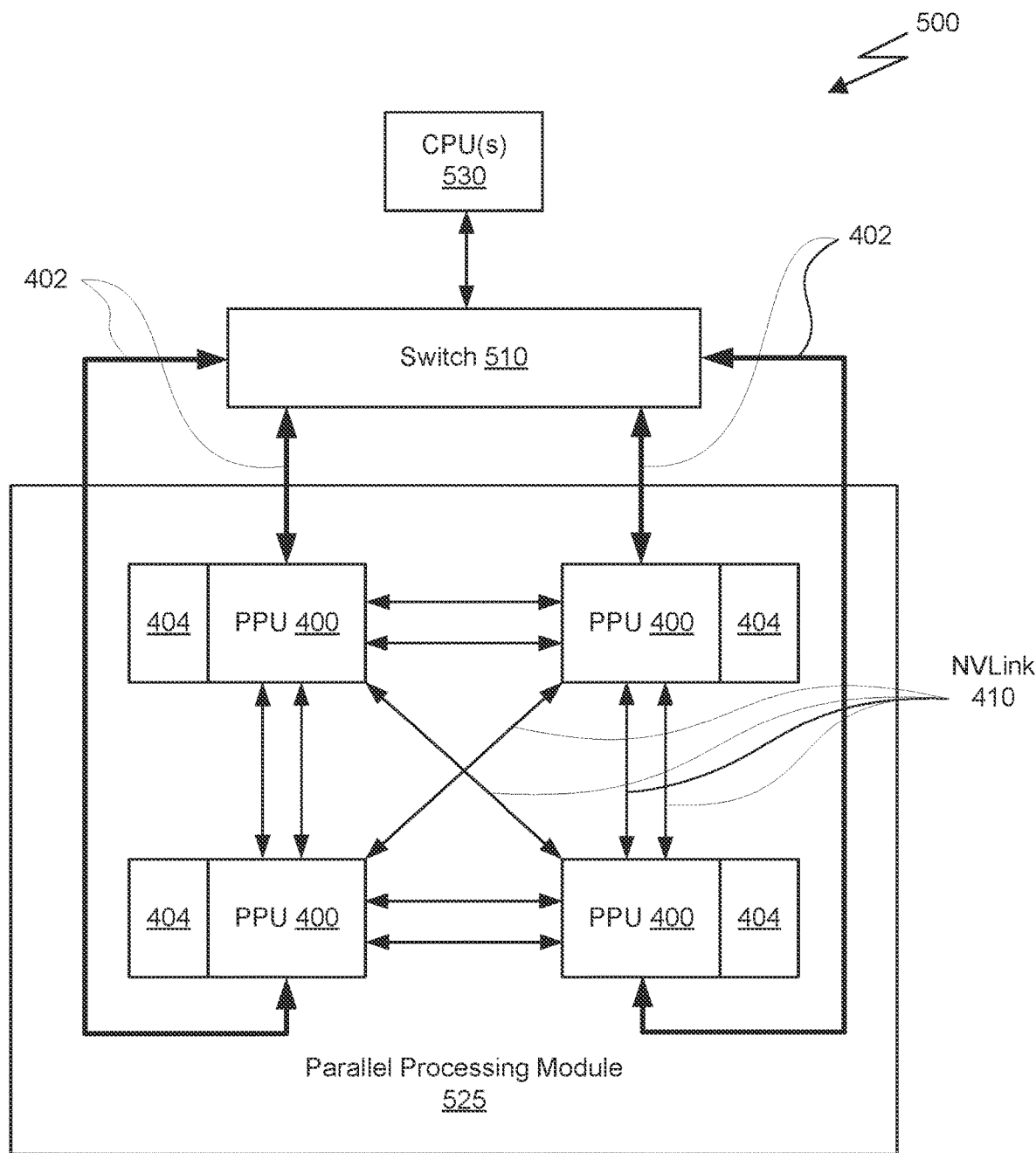
FIG. 5A is a conceptual diagram of a processing system implemented using the PPU of FIG. 4, suitable for use in implementing some embodiments of the present disclosure.

FIG. 5A is a conceptual diagram of a processing system 500 implemented using the PPU 400 of FIG. 4, in accordance with an embodiment. The processing system 500 includes a CPU 530, switch 510, and multiple PPUs 400, and respective memories 404.

Figure 5B:
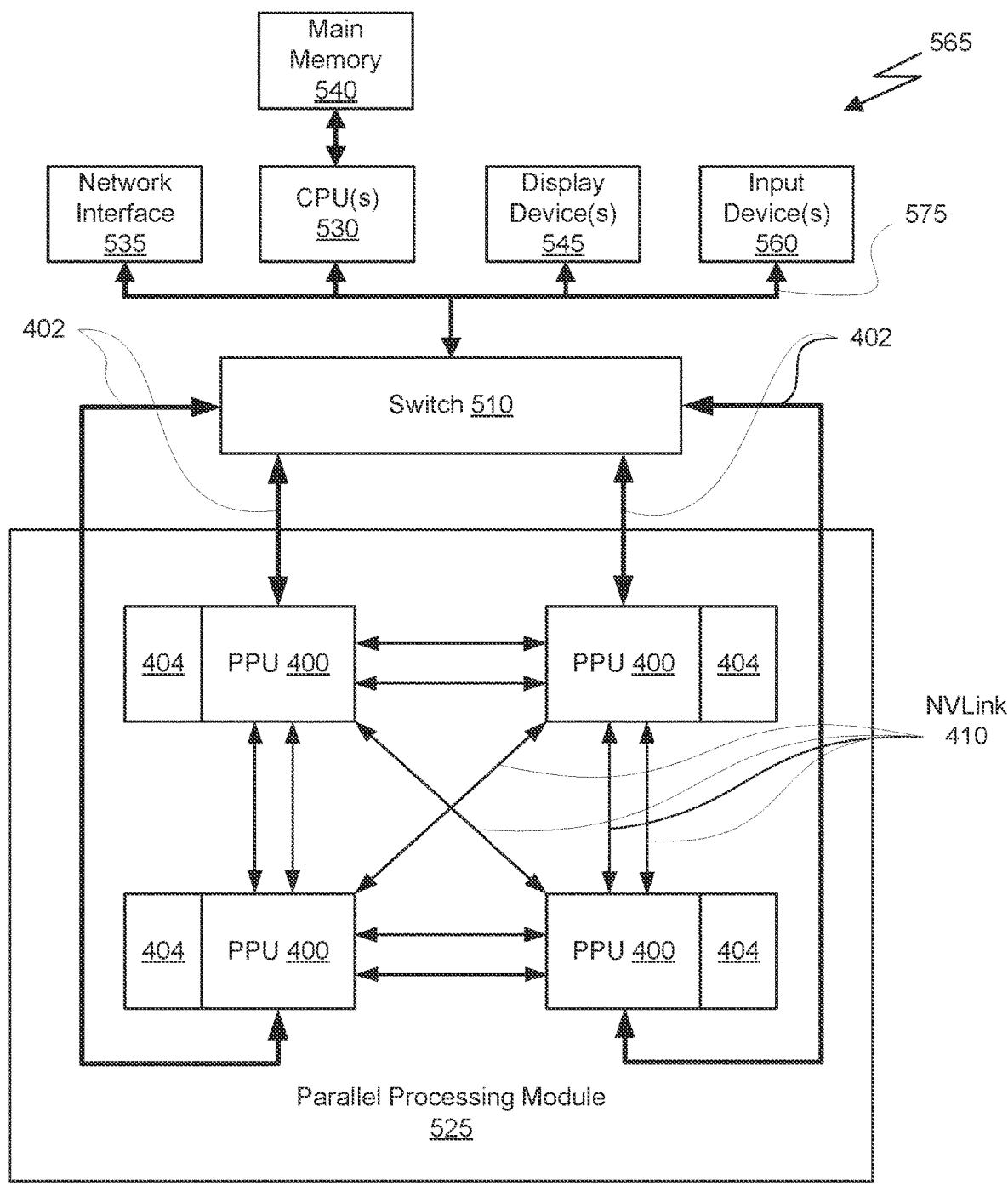
FIG. 5B illustrates an exemplary system in which the various architecture and/or functionality of the various previous embodiments may be implemented.

The NVLink 410 provides high-speed communication links between each of the PPUs 400. Although a particular number of NVLink 410 and interconnect 402 connections are illustrated in FIG. 5B, the number of connections to each PPU 400 and the CPU 530 may vary. The switch 510 interfaces between the interconnect 402 and the CPU 530. The PPUs 400, memories 404, and NVLinks 410 may be situated on a single semiconductor platform to form a parallel processing module 525. In an embodiment, the switch 510 supports two or more protocols to interface between various different connections and/or links.

In another embodiment (not shown), the NVLink 410 provides one or more high-speed communication links between each of the PPUs 400 and the CPU 530 and the switch 510 interfaces between the interconnect 402 and each of the PPUs 400. The PPUs 400, memories 404, and interconnect 402 may be situated on a single semiconductor platform to form a parallel processing module 525. In yet another embodiment (not shown), the interconnect 402 provides one or more communication links between each of the PPUs 400 and the CPU 530 and the switch 510 interfaces between each of the PPUs 400 using the NVLink 410 to provide one or more high-speed communication links between the PPUs 400. In another embodiment (not shown), the NVLink 410 provides one or more high-speed communication links between the PPUs 400 and the CPU 530 through the switch 510. In yet another embodiment (not shown), the interconnect 402 provides one or more communication links between each of the PPUs 400 directly. One or more of the NVLink 410 high-speed communication links may be implemented as a physical NVLink interconnect or either an on-chip or on-die interconnect using the same protocol as the NVLink 410.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 400 and/or memories 404 may be packaged devices. In an embodiment, the CPU 530, switch 510, and the parallel processing module 525 are situated on a single semiconductor platform.

In an embodiment, the signaling rate of each NVLink 410 is 20 to 25 Gigabits/second and each PPU 400 includes six NVLink 410 interfaces (as shown in FIG. 5A, five NVLink 410 interfaces are included for each PPU 400). Each NVLink 410 provides a data transfer rate of 25 Gigabytes/second in each direction, with six links providing 400 Gigabytes/second. The NVLinks 410 can be used exclusively for PPU-to-PPU communication as shown in FIG. 5A, or some combination of PPU-to-PPU and PPU-to-CPU, when the CPU 530 also includes one or more NVLink 410 interfaces.

In an embodiment, the NVLink 410 allows direct load/store/atomic access from the CPU 530 to each PPU's 400 memory 404. In an embodiment, the NVLink 410 supports coherency operations, allowing data read from the memories 404 to be stored in the cache hierarchy of the CPU 530, reducing cache access latency for the CPU 530. In an embodiment, the NVLink 410 includes support for Address Translation Services (ATS), allowing the PPU 400 to directly access page tables within the CPU 530. One or more of the NVLinks 410 may also be configured to operate in a low-power mode.

FIG. 5B illustrates an exemplary system 565 in which the various architecture and/or functionality of the various previous embodiments may be implemented. As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525. Where there is direct, or point-to-point connection between components, the communication bus 575 may include a PCIe link to carry out the connection. In these examples, a PCI bus need not be included in the system 565.

Although the various blocks of FIG. 5B are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5B is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5B.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor, and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an x86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof.

The system 565 also includes input device(s) 560, the parallel processing system 525, and display device(s) 545. The display device(s) 545 may include a display (e.g., a monitor, a touch screen, a television screen, a heads-up-display (HUD), other display types, or a combination thereof), speakers, and/or other presentation components. The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may be implemented as a network interface controller (NIC) that includes one or more data processing units (DPUs) to perform operations such as (for example and without limitation) packet parsing and accelerating network processing and communication. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system 565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 5A and/or exemplary system 565 of FIG. 5B—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

Figure 5C:
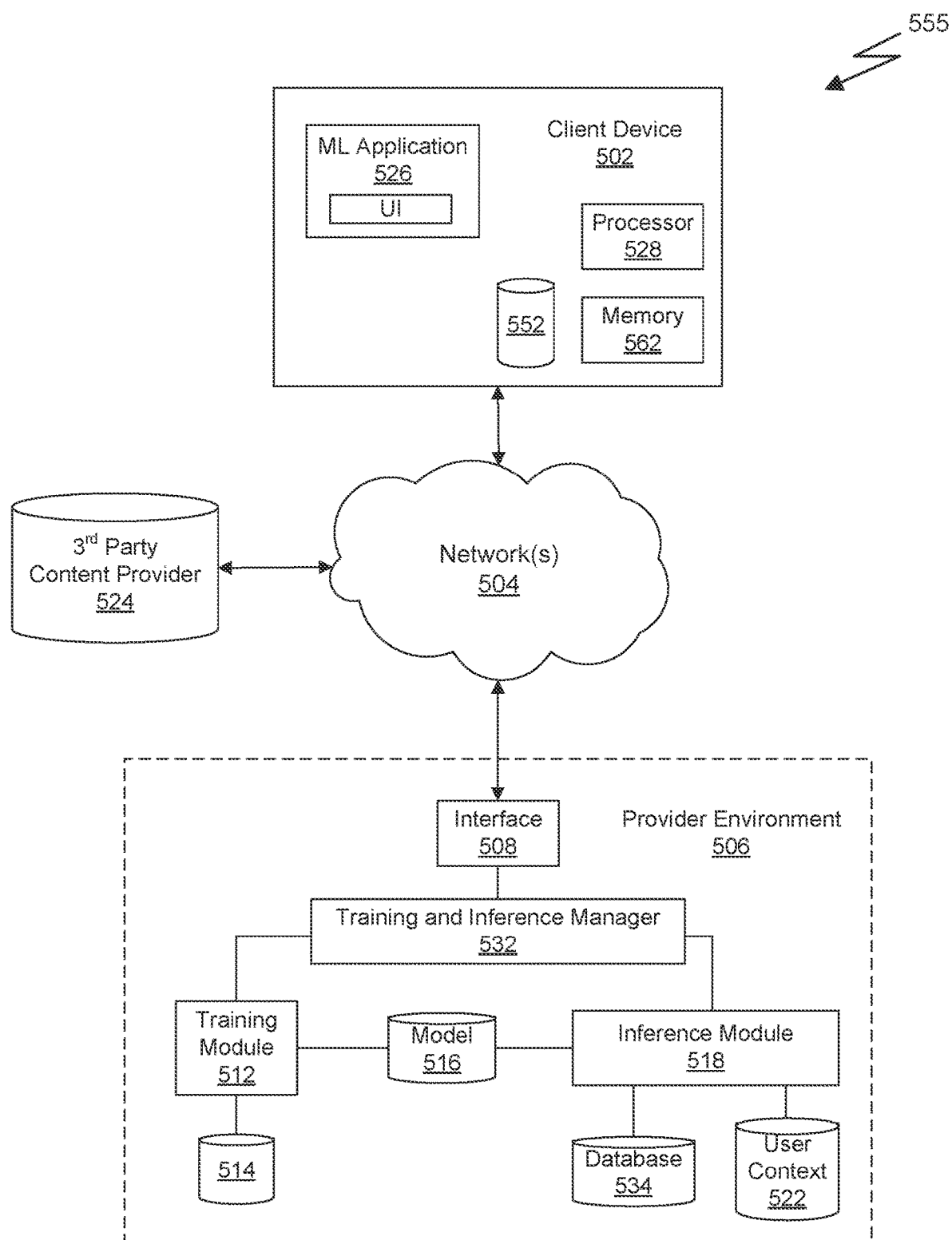
FIG. 5C illustrates components of an exemplary system that can be used to train and utilize machine learning, in at least one embodiment.

The client device(s) may include at least some of the components, features, and functionality of the example processing system 500 of FIG. 5B and/or exemplary system 565 of FIG. 5C. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Machine Learning

Deep neural networks (DNNs) developed on processors, such as the PPU 400 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 400. Inferencing is less compute-intensive than training, being a latency-sensitive process where a trained neural network is applied to new inputs it has not seen before to classify images, detect emotions, identify recommendations, recognize and translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 400 is a computing platform capable of delivering performance required for deep neural network-based artificial intelligence and machine learning applications.

Furthermore, images generated applying one or more of the techniques disclosed herein may be used to train, test, or certify DNNs used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

FIG. 5C illustrates components of an exemplary system 555 that can be used to train and utilize machine learning, in accordance with at least one embodiment. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 506, while in at least one embodiment training might be requested by a customer or other user having access to a provider environment through a client device 502 or other such resource. In at least one embodiment, training data (or data to be analyzed by a trained neural network) can be provided by a provider, a user, or a third party content provider 524. In at least one embodiment, client device 502 may be a vehicle or object that is to be navigated on behalf of a user, for example, which can submit requests and/or receive instructions that assist in navigation of a device.

In at least one embodiment, requests are able to be submitted across at least one network 504 to be received by a provider environment 506. In at least one embodiment, a client device may be any appropriate electronic and/or computing devices enabling a user to generate and send such requests, such as, but not limited to, desktop computers, notebook computers, computer servers, smartphones, tablet computers, gaming consoles (portable or otherwise), computer processors, computing logic, and set-top boxes. Network(s) 504 can include any appropriate network for transmitting a request or other such data, as may include Internet, an intranet, an Ethernet, a cellular network, a local area network (LAN), a wide area network (WAN), a personal area network (PAN), an ad hoc network of direct wireless connections among peers, and so on.

In at least one embodiment, requests can be received at an interface layer 508, which can forward data to a training and inference manager 532, in this example. The training and inference manager 532 can be a system or service including hardware and software for managing requests and service corresponding data or content, in at least one embodiment, the training and inference manager 532 can receive a request to train a neural network, and can provide data for a request to a training module 512. In at least one embodiment, training module 512 can select an appropriate model or neural network to be used, if not specified by the request, and can train a model using relevant training data. In at least one embodiment, training data can be a batch of data stored in a training data repository 514, received from client device 502, or obtained from a third party provider 524. In at least one embodiment, training module 512 can be responsible for training data. A neural network can be any appropriate network, such as a recurrent neural network (RNN) or convolutional neural network (CNN). Once a neural network is trained and successfully evaluated, a trained neural network can be stored in a model repository 516, for example, that may store different models or networks for users, applications, or services, etc. In at least one embodiment, there may be multiple models for a single application or entity, as may be utilized based on a number of different factors.

In at least one embodiment, at a subsequent point in time, a request may be received from client device 502 (or another such device) for content (e.g., path determinations) or data that is at least partially determined or impacted by a trained neural network. This request can include, for example, input data to be processed using a neural network to obtain one or more inferences or other output values, classifications, or predictions, or for at least one embodiment, input data can be received by interface layer 508 and directed to inference module 518, although a different system or service can be used as well. In at least one embodiment, inference module 518 can obtain an appropriate trained network, such as a trained deep neural network (DNN) as discussed herein, from model repository 516 if not already stored locally to inference module 518. Inference module 518 can provide data as input to a trained network, which can then generate one or more inferences as output. This may include, for example, a classification of an instance of input data. In at least one embodiment, inferences can then be transmitted to client device 502 for display or other communication to a user. In at least one embodiment, context data for a user may also be stored to a user context data repository 522, which may include data about a user which may be useful as input to a network in generating inferences, or determining data to return to a user after obtaining instances. In at least one embodiment, relevant data, which may include at least some of input or inference data, may also be stored to a local database 534 for processing future requests. In at least one embodiment, a user can use account information or other information to access resources or functionality of a provider environment. In at least one embodiment, if permitted and available, user data may also be collected and used to further train models, in order to provide more accurate inferences for future requests. In at least one embodiment, requests may be received through a user interface to a machine learning application 526 executing on client device 502, and results displayed through a same interface. A client device can include resources such as a processor 528 and memory 562 for generating a request and processing results or a response, as well as at least one data storage element 552 for storing data for machine learning application 526.

In at least one embodiment a processor 528 (or a processor of training module 512 or inference module 518) will be a central processing unit (CPU). As mentioned, however, resources in such environments can utilize GPUs to process data for at least certain types of requests. With thousands of cores, GPUs, such as PPU 300 are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions must be generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

In at least one embodiment, video data can be provided from client device 502 for enhancement in provider environment 506. In at least one embodiment, video data can be processed for enhancement on client device 502. In at least one embodiment, video data may be streamed from a third party content provider 524 and enhanced by third party content provider 524, provider environment 506, or client device 502. In at least one embodiment, video data can be provided from client device 502 for use as training data in provider environment 506.

In at least one embodiment, supervised and/or unsupervised training can be performed by the client device 502 and/or the provider environment 506. In at least one embodiment, a set of training data 514 (e.g., classified or labeled data) is provided as input to function as training data. In at least one embodiment, training data can include instances of at least one type of object for which a neural network is to be trained, as well as information that identifies that type of object. In at least one embodiment, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. In at least one embodiment, training data 514 is provided as training input to a training module 512. In at least one embodiment, training module 512 can be a system or service that includes hardware and software, such as one or more computing devices executing a training application, for training a neural network (or other model or algorithm, etc.). In at least one embodiment, training module 512 receives an instruction or request indicating a type of model to be used for training, in at least one embodiment, a model can be any appropriate statistical model, network, or algorithm useful for such purposes, as may include an artificial neural network, deep learning algorithm, learning classifier, Bayesian network, and so on. In at least one embodiment, training module 512 can select an initial model, or other untrained model, from an appropriate repository 516 and utilize training data 514 to train a model, thereby generating a trained model (e.g., trained deep neural network) that can be used to classify similar types of data, or generate other such inferences. In at least one embodiment where training data is not used, an appropriate initial model can still be selected for training on input data per training module 512.

In at least one embodiment, a model can be trained in a number of different ways, as may depend in part upon a type of model selected. In at least one embodiment, a machine learning algorithm can be provided with a set of training data, where a model is a model artifact created by a training process. In at least one embodiment, each instance of training data contains a correct answer (e.g., classification), which can be referred to as a target or target attribute. In at least one embodiment, a learning algorithm finds patterns in training data that map input data attributes to a target, an answer to be predicted, and a machine learning model is output that captures these patterns. In at least one embodiment, a machine learning model can then be used to obtain predictions on new data for which a target is not specified.

In at least one embodiment, training and inference manager 532 can select from a set of machine learning models including binary classification, multiclass classification, generative, and regression models. In at least one embodiment, a type of model to be used can depend at least in part upon a type of target to be predicted.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server, a data center, or in a cloud-based computing environment and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA Geforce Now (GFN), Google Stadia, and the like.

Example Streaming System

Figure 6:
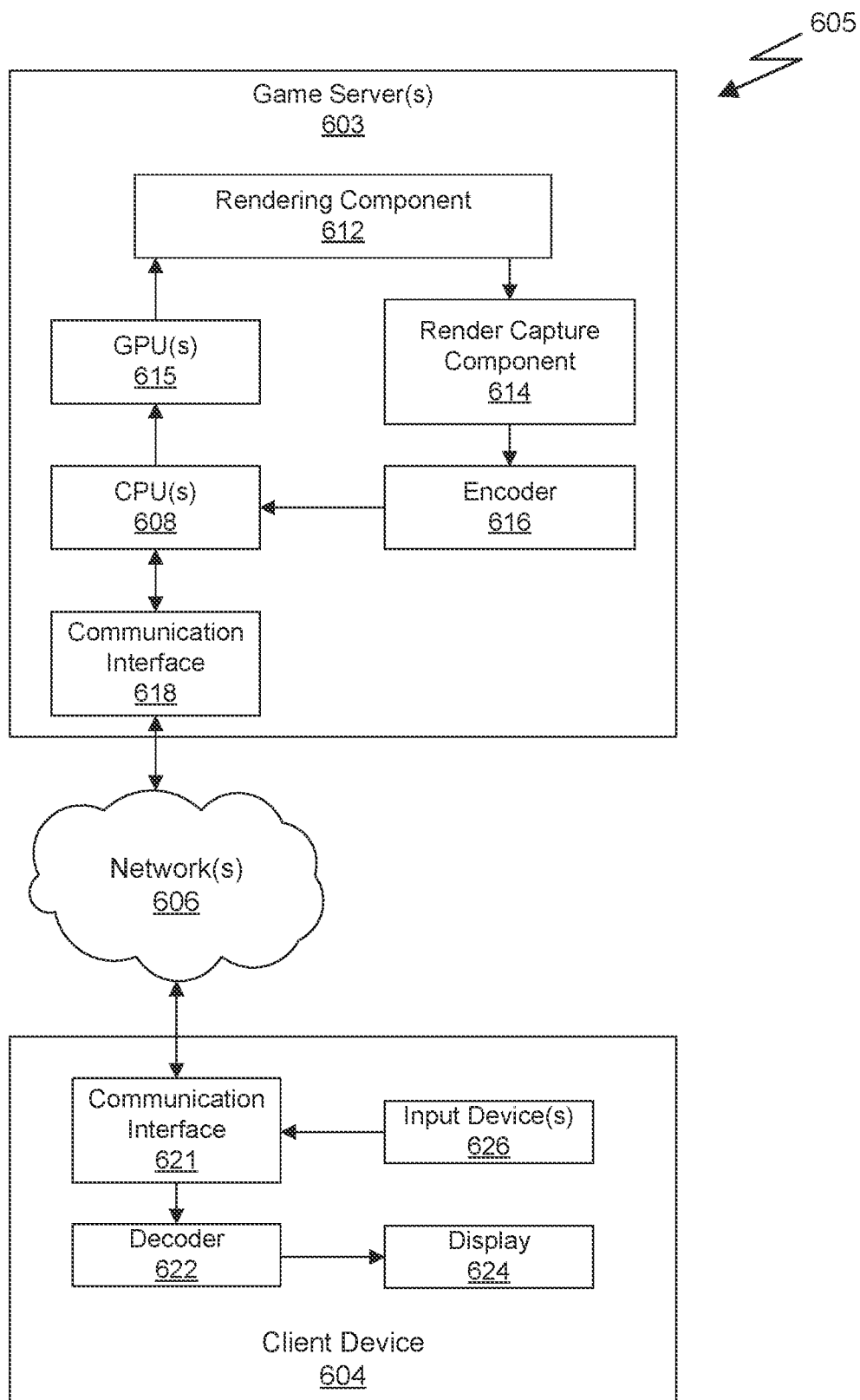
FIG. 6 illustrates an exemplary streaming system suitable for use in implementing some embodiments of the present disclosure.

FIG. 6 is an example system diagram for a streaming system 605, in accordance with some embodiments of the present disclosure. FIG. 6 includes server(s) 603 (which may include similar components, features, and/or functionality to the example processing system 500 of FIG. 5A and/or exemplary system 565 of FIG. 5B), client device(s) 604 (which may include similar components, features, and/or functionality to the example processing system 500 of FIG. 5A and/or exemplary system 565 of FIG. 5B), and network(s) 606 (which may be similar to the network(s) described herein). In some embodiments of the present disclosure, the system 605 may be implemented.

In an embodiment, the streaming system 605 is a game streaming system and the sever(s) 604 are game server(s). In the system 605, for a game session, the client device(s) 604 may only receive input data in response to inputs to the input device(s) 626, transmit the input data to the server(s) 603, receive encoded display data from the server(s) 603, and display the display data on the display 624. As such, the more computationally intense computing and processing is offloaded to the server(s) 603 (e.g., rendering—in particular ray or path tracing—for graphical output of the game session is executed by the GPU(s) 615 of the server(s) 603). In other words, the game session is streamed to the client device(s) 604 from the server(s) 603, thereby reducing the requirements of the client device(s) 604 for graphics processing and rendering.

For example, with respect to an instantiation of a game session, a client device 604 may be displaying a frame of the game session on the display 624 based on receiving the display data from the server(s) 603. The client device 604 may receive an input to one of the input device(s) 626 and generate input data in response. The client device 604 may transmit the input data to the server(s) 603 via the communication interface 621 and over the network(s) 606 (e.g., the Internet), and the server(s) 603 may receive the input data via the communication interface 618. The CPU(s) 608 may receive the input data, process the input data, and transmit data to the GPU(s) 615 that causes the GPU(s) 615 to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units-such as GPUs, which may further employ the use of one or more dedicated hardware accelerators or processing cores to perform ray or path-tracing techniques—of the server(s) 603. The encoder 616 may then encode the display data to generate encoded display data and the encoded display data may be transmitted to the client device 604 over the network(s) 606 via the communication interface 618. The client device 604 may receive the encoded display data via the communication interface 621 and the decoder 622 may decode the encoded display data to generate the display data. The client device 604 may then display the display data via the display 624.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A method, comprising:
receiving a point cloud and a natural language instruction;
generating, via a first network, an instance mask based on the natural language instruction, wherein the instance mask identifies a set of query objects in the point cloud;
generating, via a second network, samples of pose offsets for the set of query objects in accordance with the natural language instruction; and
identifying, via a discriminator network, a selected rearrangement of the set of query objects in accordance with scores.

2. The method of claim 1, wherein the point cloud represents a scene including a plurality of objects, and wherein the set of query objects is a subset of the objects in the scene that are identified to be moved in order to satisfy the natural language instruction.

3. The method of claim 1, wherein at least one of the first network or the second network is configured to generate embeddings for the point cloud and the natural language instruction used as inputs to the first network or the second network.

4. The method of claim 1, wherein at least one of the first network or the second network is a transformer-based neural network comprising an encoder and a decoder, and wherein each of the encoder and the decoder comprises a plurality of layers.

5. The method of claim 4, wherein a layer of the encoder includes a first sub-layer that includes a multi-head attention mechanism and a second sub-layer that includes a fully-connected feed-forward layer.

6. The method of claim 5, wherein a layer of the decoder includes a first sub-layer that includes a masked multi-head attention mechanism, a second sub-layer that includes a multi-head attention mechanism, and a third sub-layer that includes a fully-connected feed-forward layer.

7. The method of claim 1, wherein each sample comprises a set of pose offsets corresponding to the set of query objects, and wherein each pose offset comprises a parameterization of a six degree of freedom (6-DOF) transformation.

8. The method of claim 1, wherein identifying the selected rearrangement comprises:
comparing each of the scores to a threshold value; and
selecting a particular sample having a score that is greater than the threshold value as the selected rearrangement, or
responsive to determining that no samples have a score greater than the threshold value, refining the samples using a cross-entropy method.

9. The method of claim 1, further comprising:
rearranging a number of objects using a robot based on the selected rearrangement.

10. The method of claim 1, further comprising training the discriminator network using a set of scenes and a set of randomly perturbed scenes as positive and negative samples, respectively.

11. A system for rearranging objects in a scene, the system comprising:
a memory storing a point cloud and a natural language instruction; and
at least one processor configured to:
generate, via a first network, an instance mask based on the natural language instruction, wherein the instance mask identifies a set of query objects in the point cloud;
generate, via a second network, samples of pose offsets for the set of query objects in accordance with the natural language instruction; and
identify, via a discriminator network, a selected rearrangement of the set of query objects in accordance with scores.

12. The system of claim 11, wherein the point cloud represents a scene including a plurality of objects, and wherein the set of query objects is a subset of the objects in the scene that are identified to be moved in order to satisfy the natural language instruction.

13. The system of claim 11, wherein at least one of the first network or the second network is configured to generate embeddings for the point cloud and the natural language instruction used as inputs to the first network or the second network.

14. The system of claim 11, wherein at least one of the first network or the second network is a transformer-based neural network comprising an encoder and a decoder, and wherein each of the encoder and the decoder comprises a plurality of layers.

15. The system of claim 14, wherein a layer of the encoder includes a first sub-layer that includes a multi-head attention mechanism and a second sub-layer that includes a fully-connected feed-forward layer.

16. The system of claim 15, wherein a layer of the decoder includes a first sub-layer that includes a masked multi-head attention mechanism, a second sub-layer that includes a multi-head attention mechanism, and a third sub-layer that includes a fully-connected feed-forward layer.

17. The system of claim 11, wherein each sample comprises a set of pose offsets corresponding to the set of query objects, and wherein each pose offset comprises a parameterization of a six degree of freedom (6-DOF) transformation.

18. The system of claim 11, wherein identifying the selected rearrangement comprises:
   comparing each of the scores to a threshold value; and
   selecting a particular sample having a score that is greater than the threshold value as the selected rearrangement, or
   responsive to determining that no samples have a score greater than the threshold value, refining the samples using a cross-entropy method.

19. The system of claim 11, further comprising a robot that rearranges a number of objects based on the selected rearrangement.

20. A non-transitory computer readable medium storing instructions that, responsive to being executed by at least one processor, cause a system to:
   receive a point cloud and a natural language instruction;
   generate, via a first network, an instance mask based on the natural language instruction, wherein the instance mask identifies a set of query objects in the point cloud;
   generate, via a second network, samples of pose offsets for the set of query objects in accordance with the natural language instruction; and
   identify, via a discriminator network, a selected rearrangement of the set of query objects in accordance with scores.

* * * * *